United States Patent
Hoshi

(10) Patent No.: US 11,981,533 B2
(45) Date of Patent: May 14, 2024

(54) MEDIUM ISSUING DEVICE, MEDIUM ISSUING SYSTEM AND MEDIUM ISSUING METHOD

(71) Applicant: NIDEC SANKYO CORPORATION, Nagano (JP)

(72) Inventor: Tomohiro Hoshi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 18/070,656

(22) Filed: Nov. 29, 2022

(65) Prior Publication Data

US 2023/0166933 A1 Jun. 1, 2023

(30) Foreign Application Priority Data

Nov. 30, 2021 (JP) ................. 2021-194748

(51) Int. Cl.
*G06K 15/16* (2006.01)
*B65H 7/20* (2006.01)
*G06K 15/02* (2006.01)
*G06K 15/12* (2006.01)

(52) U.S. Cl.
CPC ............ *B65H 7/20* (2013.01); *G06K 15/129* (2013.01); *G06K 15/16* (2013.01); *G06K 15/1843* (2013.01); *B65H 2403/82* (2013.01); *G06K 15/1868* (2013.01)

(58) Field of Classification Search
CPC .................................................. G06K 15/1843
See application file for complete search history.

(56) References Cited

U.S. PATENT DOCUMENTS

| 2018/0088881 A1* | 3/2018 | Kuronuma | H04N 1/00761 |
| 2019/0126615 A1* | 5/2019 | Tanaka | B41J 2/04568 |
| 2019/0126647 A1* | 5/2019 | Tanaka | B41J 2/2146 |
| 2022/0083828 A1* | 3/2022 | Akiyama | H04N 1/00037 |

FOREIGN PATENT DOCUMENTS

| JP | 2000203098 A | * | 7/2000 | |
| JP | 2002012852 A | | 1/2002 | |
| JP | 2011135387 A | * | 7/2011 | ............. G06K 15/10 |

* cited by examiner

*Primary Examiner* — Ted W Barnes
(74) *Attorney, Agent, or Firm* — CANTOR COLBURN LLP

(57) ABSTRACT

A medium issuing device for issuing a medium includes a drive part which drives a conveyance mechanism for conveying the medium in a conveyance passage, a printing part which reads out printing data and prints on the medium according to drive by the drive part, and a control part which acquires enlarged printing data when code data are included in the printing data, the enlarged printing data being enlarged in a conveyance direction of the medium with respect to an original size which do not include the code data, and the control part controls a driving speed of the drive part to a lower speed than a normal driving speed according to an enlargement ratio at least in a portion of the code data.

6 Claims, 4 Drawing Sheets

MEDIUM ISSUING DEVICE, MEDIUM ISSUING SYSTEM AND MEDIUM ISSUING METHOD

CROSS REFERENCE TO RELATED APPLICATION

The present invention claims priority under 35 U.S.C. § 119 to Japanese Application No. 2021-194748 filed Nov. 30, 2021, the entire content of which is incorporated herein by reference.

TECHNICAL FIELD

At least an embodiment of the present invention may relate to a medium issuing device structured to issue a medium such as a card, a medium issuing system and a medium issuing method.

BACKGROUND

Conventionally, a card issuing system has been known which is structured to issue a card-shaped recording medium (hereinafter, simply referred to as a "card"). Such a card issuing system is structured so that a card issuing device for issuing a card is connected with a host apparatus such as an ATM (Automated Teller Machine). Such a card issuing device is often structured so as to provide with an accommodation part in which cards before issue are laminated and accommodated and a printing part such as a printer for printing on a card. Printing on a card may include printing a code such as a one-dimensional or two-dimensional barcode which is mechanically read.

As one example of a conventional printing method for printing such a code, in Japanese Patent Laid-Open No. 2000-203098 (Patent Literature 1), a technique is described in which, in a case that a pattern of a "n"-dimensional code is to be printed, printing is performed by previously setting in a slightly smaller dimension depending on a resolution and a dot dimension of a using printer so that a dimension of a black pattern part when having been printed is close to an original pattern and, as a result, the "n"-dimensional code such as a one-dimensional bar-code or a two-dimensional code can be printed in a small dimension with a high degree of dimensional precision even in a dot impact printer.

However, in the technique described in Patent Literature 1, as having been increased in recent years, when a code such as a bar-code smaller than a normal size which is, for example, imaged by a smart phone or the like is printed, it may occur that the resolution is too low and printing is crushed and thus, the printing is unrecognizable.

SUMMARY

In view of the problem described above, at least an embodiment of the present invention may advantageously provide a medium issuing device which is capable of printing even a small code with a high degree of precision.

According to at least an embodiment of the present invention, there may be provided a medium issuing device for issuing a medium, the medium issuing device including a drive part which drives a conveyance mechanism for conveying the medium in a conveyance passage, a printing part which reads out printing data and prints on the medium according to drive by the drive part, and a control part which acquires enlarged printing data when code data are included in the printing data, the enlarged printing data being enlarged in a conveyance direction of the medium with respect to an original size which do not include the code data, and the control part controls a driving speed of the drive part to a lower speed than a normal driving speed according to an enlargement ratio at least in a portion of the code data. According to this configuration, even a small code can be printed with a high degree of precision.

In at least an embodiment of the present invention, the medium issuing device is configured so that the enlarged printing data including the code data are bitmap data having a size of "n"-times of the original size in the conveyance direction, and the control part controls the driving speed so that a speed that the medium is conveyed is set to be (1/"n") of the normal driving speed. According to this configuration, even the printing data which are enlarged to "n"-times can be printed in the original size.

In at least an embodiment of the present invention, the medium issuing device is configured so that the printing part performs printing according to color data included in the enlarged printing data for each time when the medium is conveyed at a plurality of times, the control part sets the driving speed to the lower speed only in a case of a printing color of the code data and, in a case of a color except the printing color, the control part changes reading of the printing data so as to be printed in a size similar to the original size while setting the driving speed to the normal driving speed. According to this configuration, reduction of a printing speed can be suppressed.

According to at least another embodiment of the present invention, there may be provided a medium issuing system including a medium issuing device which issues a medium, and a host apparatus which creates printing data for the medium issuing device. The host apparatus includes a printing data creation part which creates enlarged printing data which are enlarged in a conveyance direction of the medium when the printing data including code data are to be created, and the enlarged printing data is enlarged with respect to an original size which do not include the code data. The medium issuing device includes a drive part which drives a conveyance mechanism for conveying the medium in a conveyance passage, a printing part which reads out the printing data and prints on the medium according to drive by the drive part, and a control part which acquires the enlarged printing data from the host apparatus and controls a driving speed of the drive part to a lower speed than a normal driving speed according to an enlargement ratio at least in a portion of the code data. According to this configuration, even a small code can be printed with a high degree of precision.

According to at least another embodiment of the present invention, there may be provided a medium issuing method which is executed by a medium issuing device for issuing a medium. The medium issuing method includes driving a conveyance mechanism which conveys the medium in a conveyance passage and, in a case that code data are included in printing data, acquiring enlarged printing data which are enlarged in a conveyance direction of the medium with respect to an original size which do not include the code data, controlling a driving speed to a lower speed than a normal driving speed according to an enlargement ratio at least in a portion of the code data, and reading out the printing data and printing on the medium according to drive for conveying the medium. According to this configuration, even a small code can be printed with a high degree of precision.

Effects of the Invention

According to at least an embodiment of the present invention, in a case that code data are included in the printing data, enlarged printing data enlarged in a conveyance direction of a medium with respect to an original size are acquired and a driving speed of a drive part is controlled to a lower speed according to an enlargement ratio. As a result, a medium issuing device can be provided in which even a small code is capable of being printed with a high degree of precision.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments (Configuration of Card Issuing System "X")

Figure 1:
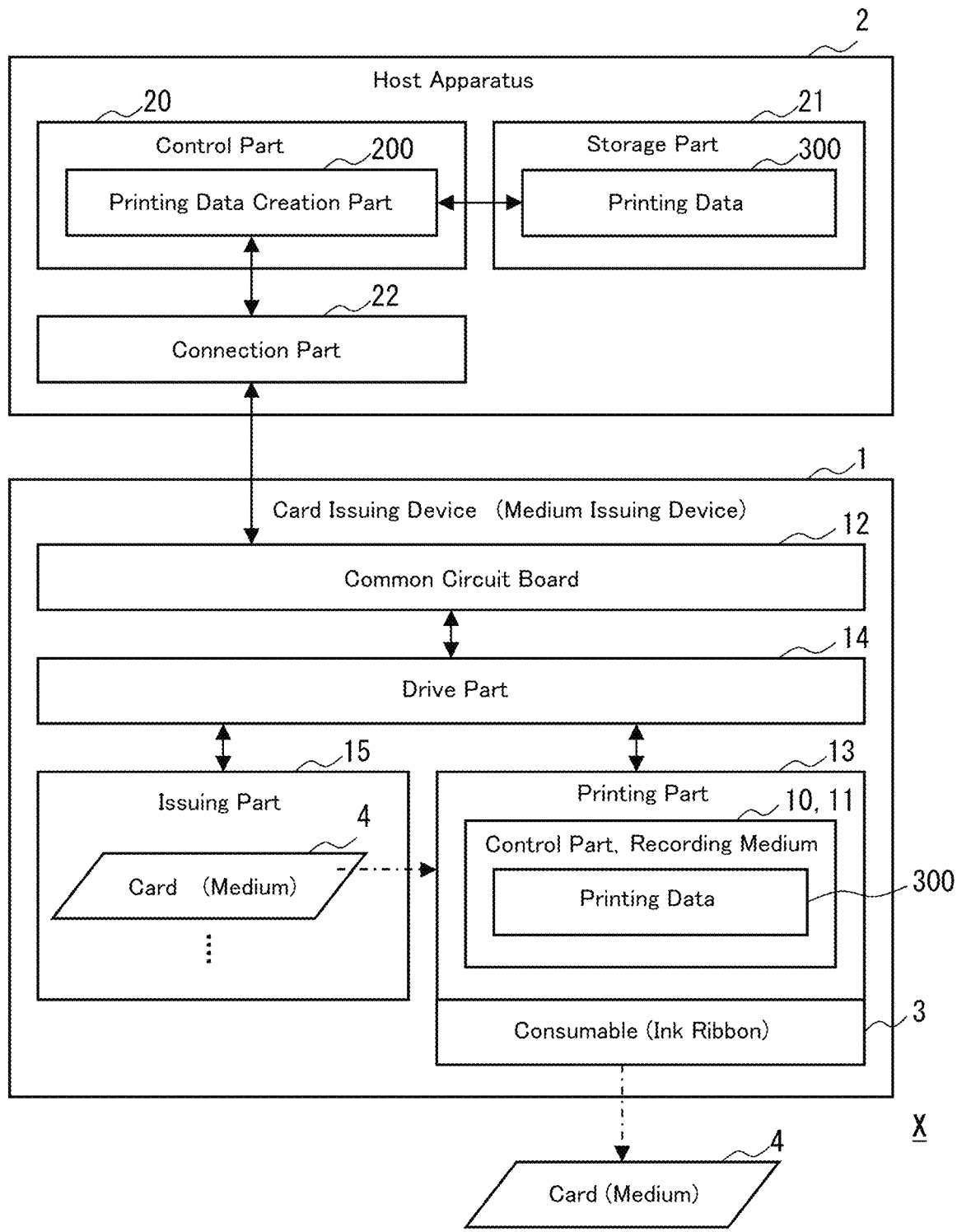
FIG. 1 is a system configuration diagram showing a card issuing system in accordance with an embodiment of the present invention.

A configuration of a card issuing system "X" in accordance with an embodiment of the present invention will be described below with reference to FIG. 1. The card issuing system "X" in accordance with this embodiment is one example of a medium issuing system which is structured to issue a medium. Specifically, the card issuing system "X" is a device for issuing a new card 4 (medium). The card issuing system "X" includes, for example, an ATM and a terminal in a kiosk provided with a card issuing function, a ticket issuing system of transportation, a point card issuing system of a convenience store, a member card issuing system of a retail store, a card issuing and payment system of a game machine, an entry/exit management system, a ticket issuing system of a vehicle, a managerial system of a parking lot, and the like (hereinafter, simply referred to as an "ATM and the like"). Specifically, the card issuing system "X" includes a card issuing device 1 and a host apparatus 2. In this embodiment, the card issuing device 1 and the host apparatus 2 are connected with each other by a USB (Universal Serial Bus) or the like.

The card issuing device 1 includes a printing and issuing printer, a card reader and the like in which information necessary for a card 4 is printed and issued based on instructions from the host apparatus 2. In this embodiment, communication between the card issuing device 1 and the host apparatus 2 are, for example, performed through a USB cable connecting between them.

In this embodiment, the host apparatus 2 is an information processing device which controls the card issuing device 1 to realize each function of an ATM or the like. Specifically, the host apparatus 2 is, for example, a main body apparatus such as an ATM and includes a control operation device such as a PC (Personal Computer) for control, a tablet terminal or a cellular phone. Therefore, the host apparatus 2 executes application software (hereinafter, simply abbreviated and described as an "application") for realizing a function of the card issuing system "X". In this embodiment, the host apparatus 2 is connected with the card issuing device 1 which is a controlled object. In addition, the host apparatus 2 is configured so as to be also capable of connecting with a network, various peripheral devices and the like.

A card 4 in this embodiment is one example of a medium corresponding to a medium issuing system in this embodiment. A card 4 is a non-contact type IC (Integrated Circuit) card, a contact type IC card and/or a magnetic card provided with a magnetic stripe and the like. A card 4 is, for example, a card made of vinyl chloride in a rectangular shape whose thickness is around 0.7-0.8 mm. In a case that a card 4 is a magnetic card, for example, a magnetic stripe where magnetic data are recorded is formed. Further, in a case that a card 4 is a non-contact type IC card and/or a contact type IC card, for example, an IC chip is incorporated. In this embodiment, a card 4 may be provided with both of an IC chip and a magnetic stripe. In addition, in a case that a card 4 is a non-contact type IC card, a short range wireless R/W (Read/Write) antenna may be incorporated. In accordance with an embodiment of the present invention, a card 4 may be a PET (polyethylene terephthalate) card whose thickness is about 0.18 to about 0.36 millimeter (mm), or may be a paper card having a predetermined thickness.

A consumable 3 corresponding to the card issuing system "X" in accordance with this embodiment is, for example, an ink ribbon used in a printing part 13 described below. The ink ribbon may be, for example, a sublimation type or thermal transfer type ink ribbon for printing a color image or a monochrome image on a card 4. In addition, in this embodiment, the ink ribbon may use color ink ribbons including films of yellow, magenta, cyan and black as regulation. The color ink ribbon may further include an overcoat layer film for protecting a printing face. In addition, the ink ribbon may also include a ribbon of only black and a special ribbon color (hereinafter, referred to as a "special color") such as a forgery prevention color containing special metal particles or the like, metal color, fluorescent color, hologram, and a thermal expansion film expanded by heat. In addition, the ink ribbon may also include a multi-time ink ribbon (usable a plurality of times). In this embodiment, the consumable 3 is stuck with an RFID (Radio Frequency IDentifier) tag (hereinafter, referred to as a "wireless tag") in a communication system (ISO 14443) similar to a non-contact type IC card, and information of a consumable including its type, ID and serial number may be managed.

(System Configuration of Card Issuing Device 1)

The card issuing device 1 includes units such as a common circuit board 12, a printing part 13, a drive part 14 and an issuing part 15.

The common circuit board 12 is a device for connecting the issuing part 15 and the printing part 13 with the host apparatus 2. In this embodiment, the common circuit board 12 is, for example, a circuit and an interface of a USB circuit board provided on a circuit board of the card issuing device 1. The common circuit board 12 includes a control operation part and a hub circuit of USB, and the common circuit board 12 is connected with the issuing part 15 and the printing part 13 through the hub.

The control operation part of the common circuit board 12 includes a CPU (Central Processing Unit), MPU (Micro Processing Unit), DSP (Digital Signal Processor), ASIC (Application Specific Integrated Circuit) or the like. Specifically, the common circuit board 12 is capable of performing reception of a command (instruction) from the host apparatus 2 and a response to the command through the USB cable. In addition, the common circuit board 12 is capable of storing printing data 300 acquired from the host apparatus 2 in a recording medium 11 of the printing part 13.

The printing part 13 is a card printer and the like which reads out printing data 300 and prints them on a card 4 according to driving of the drive part 14. In this embodiment, the printing part 13 is, for example, a thermal transfer type or a sublimation type printer, and printing is performed on a new card 4 by edge-less, double-sided, color printing or the like. As a result, the printing part 13 is capable of printing an image and characters having photograph quality on a surface of a card 4. Specifically, for example, the printing part 13 includes a circuit and a mechanism of a print head such as a thermal head and prints a full color bitmap image like the printing data 300 described below at several hundred dpi or the like. In this embodiment, an example will be described below in which the dpi when the printing data 300 of an original size are normally printed is 300 dpi.

A thermal head in accordance with this embodiment may be a heater array or the like which melts or sublimates ink contained in an ink ribbon and fixes to a card 4. In this embodiment, the printing part 13 may be configured so as to be capable of printing by using a special ink ribbon (hereinafter, referred to as a "special printing") such as a metal color, fluorescent color, hologram, overcoat, thermal expansion film for braille use or for discrimination by protrusions and recesses.

The drive part 14 drives a conveyance mechanism structured to convey a card 4 in a conveyance passage which is formed in an inside of the card issuing device 1. The drive part 14 includes drive rollers and platen rollers, which convey a card 4 along the conveyance passage in a front and rear direction. The drive roller and the platen roller are connected with a common stepping motor, an encoder and the like through a power transmission mechanism. In this embodiment, in a conveyance direction of a card 4 along the conveyance passage, a side where the card 4 is issued and ejected is referred to as a front direction, and an inner side where the issuing part 15 in which a plurality of cards 4 is stored is located is referred to as a rear direction.

The issuing part 15 is a hopper unit or the like in which new cards 4 before issue are accommodated. The issuing part 15 is capable of ejecting an accommodated card 4 toward the printing part 13 along the conveyance passage provided inside by control of the host apparatus 2.

In addition, the printing part 13 includes a control part 10 for performing conveyance of a card 4 and controlling reading and writing depending on a received command and a recording medium 11.

The control part 10 is a control operation part including a CPU, MPU, GPU (Graphics Processing Unit), DSP, ASIC or the like, and the control part 10 controls respective parts of the card issuing device 1. In addition, the control part 10 includes a control program and a non-transitory recording medium 11 in which various data including encryption data are stored in a built-in state or as a chip on module.

The recording medium 11 includes, for example, a RAM (Random Access Memory) and a ROM (Read Only Memory). The ROM includes a flash memory and other nonvolatile semiconductor memories. In addition, the ROM may configure an SSD (Solid State Drive) and an eMMC (embedded Multi-Media Card).

The printing part 13 may include, as the recording medium 11, a magnetic recording medium such as an HDD (Hard Disk Drive), an optical recording medium such as an optical disk, and other non-transitory recording medium.

The card issuing device 1 may also include a function as a card reader which takes a card 4 into an inside of the device by driving a motor by the drive part 14 to be capable of reading (read) or writing (write) of data. In this case, the card issuing device 1 may be, for example, capable of performing read/write of an IC chip and read/write of a magnetic stripe. In addition, the card issuing device 1 may include card sensors such as an optical sensor or a switch for detecting a position of a card 4 in the conveyance passage.

(System Configuration of Host Apparatus 2)

Specifically, the host apparatus 2 includes a control part 20, a storage part 21, a connection part 22 and the like.

The control part 20 is a control operation part which includes a CPU, MPU, GPU, DSP, ASIC or the like.

The storage part 21 is a recording medium including a RAM and a ROM. The ROM includes a flash memory and other nonvolatile semiconductor memories. In addition, the storage part 21 may include an SSD (Solid State Drive), a magnetic recording medium such as an HDD (Hard Disk Drive), an optical recording medium, and other non-transitory recording medium such as an optical disk.

The connection part 22 is a chip set (Chipset), a circuit such as an I/O (Input/Output) and a physical interface for connecting with an external device. The connection part 22 includes, for connecting with the card issuing device 1, a general-purpose serial interface such as a USB, a parallel interface, a digital video interface or the like. In addition, the connection part 22 also includes a physical layer of a network interface and the like for connecting with a network.

In this embodiment, an example will be described in which the card issuing device 1 is connected by the connection part 22 through a USB. In addition, the connection part 22 connects the host apparatus 2 with peripheral devices such as a display, e.g., an LCD (Liquid Crystal Display) panel or an organic EL (ElectroLuminescent) panel provided in an ATM or the like, a touch panel and various buttons.

(Functional Configuration of Card Issuing System "X")

Next, in the card issuing system "X" in accordance with an embodiment of the present invention, functional configurations for printing and issuing a card 4 will be described below. The control part 20 of the host apparatus 2 includes a printing data creation part 200. The storage part 21 stores printing data 300. A recording medium 11 of the printing part 13 of the card issuing device 1 stores the printing data 300.

The printing data creation part 200 creates printing data 300 which are to be printed when a card 4 is issued. The printing data creation part 200 is also capable of creating printing data 300 which includes code data described below. In this case, the printing data creation part 200 creates enlarged printing data 300 (hereinafter, also referred to as "enlarged data") in which a card 4 is enlarged in a conveyance direction with respect to an original size which does not include code data.

In addition, the printing data creation part 200 executes an application for an ATM or the like, for example, various transactions are performed and a card 4 is issued from the card issuing device 1. In other words, in this embodiment, the printing data creation part 200 functions also as an execution part of the application. In this embodiment, the application is, in addition to transactions, also capable of interactively responding to a user to design a card 4 and assist issue of the card 4.

In addition, the printing data creation part 200 also executes a device driver, middleware and the like for controlling the card issuing device 1. Therefore, the printing data creation part 200 transmits and receives commands and accompanying data to and from the card issuing device 1. Further, the printing data creation part 200 transmits various commands and data when transactions and issue of a card 4 are to be performed. In addition, the printing data creation part 200 is also capable of transmitting a card reading-out command for reading out information stored in a card 4 and a card writing command for writing information to the card 4.

Further, in this embodiment, the control part 10 of the printing part 13 stores the printing data 300 transmitted from the host apparatus 2 in the built-in recording medium 11. The printing part 13 is capable of printing on a card 4 based on the stored printing data 300. In this embodiment, the printing part 13 performs, for example, printing according to bitmap data for each color included in the printing data 300 of enlarged data for each time when a card 4 is conveyed at a plurality of times.

In this embodiment, the control part 10 of the printing part 13 acquires enlarged printing data 300 from the host apparatus 2 and controls so that, in at least a portion of code data, a driving speed of the drive part 14 is set to be a lower speed than a normal driving speed according to an enlargement ratio. Specifically, in this embodiment, when printing data 300 which are enlarged data of "n"-times of the original size are to be printed, the control part 10 controls the driving speed so that a speed at which a card 4 is conveyed in a portion of the code data becomes (1/"n") of the normal driving speed.

In addition, the control part 10 may set the driving speed to a lower speed only in a case of a printing color (hereinafter, referred to as a "code printing color") of the code data. In this case, in a case of a color except the code printing color, the control part 10 changes reading of the printing data 300 so as to print in a size similar to the original size while setting the driving speed to the normal driving speed. Specifically, for example, the control part 10 may thin out and read the printing data 300 in a conveyance direction.

The printing data 300 are image data which are to be printed on a card 4 by the printing part 13. In this embodiment, the printing data 300 use color bitmap data according to a resolution (dpi) of the above-mentioned printing part 13. The bitmap data may be, for example, primary colors of R (Red), G (Green) and B (Blue), or complementary colors of C (Cyan), M (Magenta), Y (Yellow) and K (black, Key plate). Further, the bitmap data of the printing data 300 may be data of Windows (registered trademark) BMP (Bitmap) format, TIFF (Tagged Image File Format), PNG (Portable Network Graphics) format or the like, and the data may be not compressed or compressed by run length, LZW (Lempel-Ziv-Welch) or the like. The bitmap data may be irreversible compression bitmap data of JPG (Joint Photographic expert Group) format or the like. In addition, a bit number of each color of the printing data 300 may be, for example, 8 bits (0-255), 16 bits (0-65536) or the like, or may be a log scale or the like. In addition, the printing data 300 may include bitmap data for special printing.

The printing data 300 may include data ("code data") for printing information (which is simply referred to as a "code") which is capable of mechanically reading by a camera of a smart phone, a dedicated reading device or the like as an optical or magnetic pattern, a pattern of capacitance or physical protrusions and recesses, or the like such as one-dimensional or two-dimensional bar-code, color code, dot aggregate and optical watermark. In this case, in this embodiment, it is possible to use the printing data 300 which are enlarged data having a size of "n"-times in the conveyance direction with respect to the normal resolution (original size).

As a specific example in this embodiment, as a size of the printing data 300, for example, color bitmap data whose original size is 960 (lateral)×600 (longitudinal) pixels at 300 dpi are used. In other words, in this size, one pixel is about 0.084 mm and its aspect ratio becomes 1:1. Further, in this example, the code data are directly drawn as a pattern in the bitmap data. In this case, when one-dimensional bar-code or the like is printed which is smaller than a normal size of JAN (Japanese Article Numbering) code or ITF (Interleaved Two of Five) code supposed to be read by a camera of a smart phone or the like, it is difficult to indicate a numerical value by a line width of one pixel and a "collapse" is generated and the resolution becomes insufficient. Therefore, in this embodiment, the printing data 300 of 2880 (lateral)×600 (longitudinal) pixels are used as an enlarged data including code data. In other words, in this example, the conveyance direction is a lateral direction, and the printing data 300 of the enlarged data (enlarged printing data 300) are enlarged three times in the lateral direction and the aspect ratio becomes a size of 1:3.

The printing data 300 may also include data as metadata or the like such as a printing feed speed, strobe value, temperature correction value and output gradation value as set values for adequately printing depending on a condition of a consumable 3 for printing. Further, the printing data 300 are transmitted to the card issuing device 1 by the printing data creation part 200 through the connection part 22 and are stored in the recording medium 11 of the printing part 13. In this case, the printing data 300 may be stored in a RAM or a flash memory of the recording medium 11 of the printing part 13.

In this embodiment, the control part 20 of the host apparatus 2 executes a control program stored in the storage part 21 and functions as the printing data creation part 200. Further, the respective parts of the above-mentioned host apparatus 2 and the card issuing device 1 are hardware resources which execute a card reader control method in this embodiment. In accordance with an embodiment of the present invention, a part or arbitrary combination of the above-mentioned functional configuration parts may be configured of circuits or hardware by using an IC, a programmable logic, an FPGA (Field-Programmable Gate Array) or the like.

(Card Issuing Processing by Card Issuing System "X")

Next, card issuing processing in a card issuing system "X" in accordance with an embodiment of the present invention will be described below with reference to FIG. 2 and FIGS. 3A, 3B and 3C. In card issuing processing in this embodiment, the host apparatus 2 executes an application for an ATM or the like, and a card 4 is printed and issued by using the card issuing device 1. In this case, when the printing data 300 including code data are to be created in the host apparatus 2, the printing data 300 of enlarged data are created which are enlarged in the conveyance direction of a card 4 with respect to the original size and a code is drawn (added). After that, a card 4 is printed in the card issuing device 1 by using acquired printing data 300 in a state that a driving speed of the drive part 14 is set to a lower speed than a normal driving speed according to an enlargement ratio of the enlarged data.

The card issuing processing in this embodiment is performed so that, in the card issuing device 1, the control part 10 of the printing part 13 and control means of respective parts execute control programs (not shown) stored in the recording medium 11 and the like and, in the host apparatus 2, the control part 20 executes a control program (not shown) stored in the storage part 21, in cooperation with the respective parts by using hardware resources. Next, the card issuing processing in this embodiment will be described below for each step with reference to a flow chart shown in FIG. 2.

(Step S101)

First, the printing data creation part 200 of the host apparatus 2 performs printing data creation processing. In this step, the printing data creation part 200 executes an application for performing card issue and printing in an ATM or the like. This application may be executed in response to an instruction of a user, a card transaction of a card 4, a point card issue and the like.

Next, the printing data creation part 200 receives operation by a user through a touch panel, ten keys or the like to create printing data 300 for card issue. The printing data creation part 200 may create the printing data 300 having an original size in an initial state. In this case, the printing data creation part 200 may read out image data having an original size of a default (specified) stored in the storage part 21 and copies or the like to the printing data 300 to set as a default (specified) data. In addition, in this case, it may be configured that the printing data creation part 200 photographs a face of a user who operates an ATM or the like by a camera not shown and adds the data to the printing data 300.

Figure 3A:
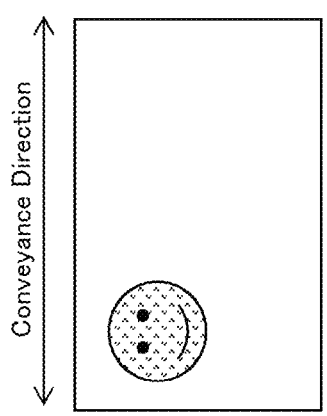
FIGS. 3A, FIG. 3B and FIG. 3C are schematic views showing printing data, enlarged data and a printed card in the card issuing processing shown in FIG. 2.

FIG. 3A shows an example of printing data 300-1 having an original size added with a photograph. The printing data 300-1 may include meta data which indicate that the data are an original size.

(Step S102)

Next, the printing data creation part 200 determines whether a code is added to the created printing data 300 or not. The printing data creation part 200 determines "Yes" in a case that the application instructs to add a code, in other words, when the printing data 300 including code data are to be created. The printing data creation part 200 determines "No" in other cases. In the case of "Yes", the printing data creation part 200 advances the processing to step S103. In the case of "No", the printing data creation part 200 advances the processing to step S104.

(Step S103)

In a case that the printing data 300 to be created includes the code, the printing data creation part 200 performs enlarged data creation processing. The printing data creation part 200 creates enlarged printing data 300 which are enlarged "n"-times of an original size in a conveyance direction of a card 4, in other words, the printing data 300 of enlarged data having a size of enlargement ratio "n"-times are created.

In this case, the printing data creation part 200 may enlarge the image data which has been already drawn in the printing data 300 of an original size to "n"-times. Further, in this case, the printing data creation part 200 may merely copy so that one pixel becomes "n"-pixels in a conveyance direction. Alternatively, the printing data creation part 200 may enlarge one pixel to "n"-pixels so that change in color and gradation becomes smooth by bilinear filtering or the like. Alternatively, the printing data creation part 200 may simply perform filling a color except a code printing color with gradation such as white or black in an enlarged portion to speed up processing.

In addition, the printing data creation part 200 may set a resolution enlarged by "n"-times and existence of a code in meta data or the like of the printing data 300. Further, the printing data creation part 200 may set data and the like for a speed of printing at a low speed of (1/"n")-times in meta data and the like. After that, the printing data creation part 200 draws the code on the printing data 300 enlarged in the conveyance direction in a state that the resolution in the conveyance direction is enlarged to "n"-times.

Figure 3B:
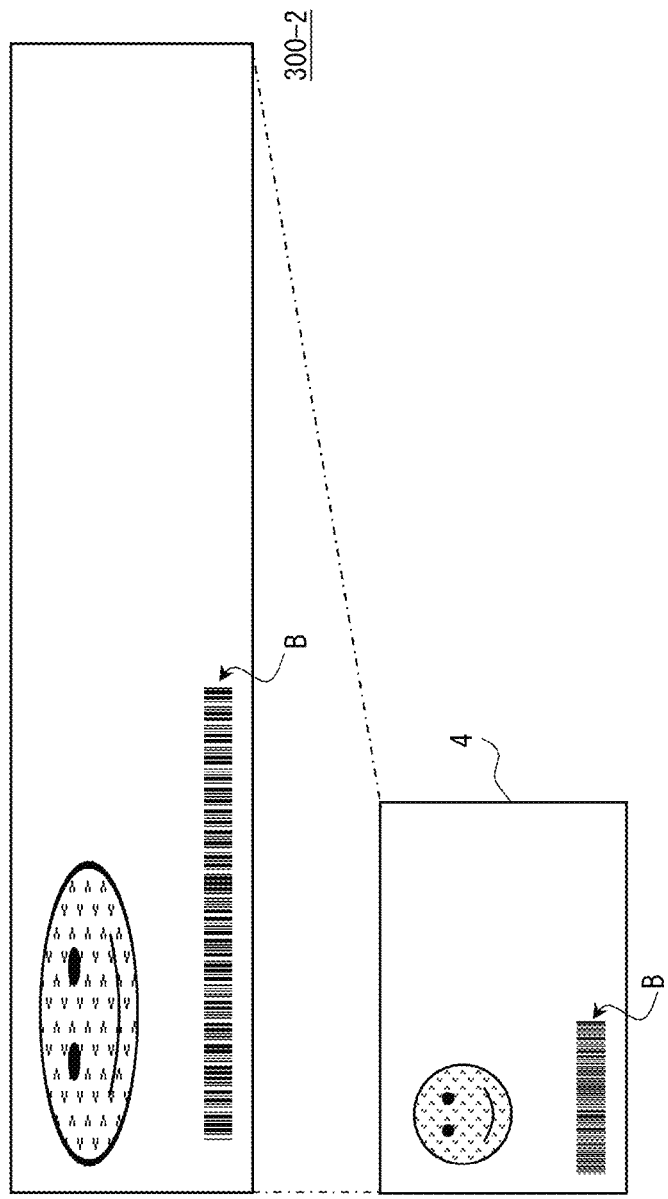

FIG. 3B shows an example in which the printing data creation part 200 creates, as the enlarged data, bitmap data enlarged three-times in the conveyance direction as printing data 300-2, and the printing data creation part 200 draws one-dimensional bar-code "B" with the resolution of three-times in a lateral direction. In this example, the printing data creation part 200 draws a width of each bar of one-dimensional bar-code "B" three-times in a lateral direction (conveyance direction).

In addition, the printing data creation part 200 is capable of storing a code printing color, rectangular coordinates of a portion where the code is drawn, a drawing-start coordinate and drawing end coordinate in the conveyance direction, or data of coordinates or the like of a polygon to meta data and the like of the printing data 300 as a portion of the code data. The printing data creation part 200 may set the rectangular coordinates, the drawing-start coordinate and drawing end coordinate, or the coordinates or the like of the polygon based on the number of pixels in a longitudinal and lateral direction (conveyance direction and a direction perpendicular to the conveyance direction) of the printing data which are enlarged three times. In a case that a plurality of codes has been drawn, the printing data creation part 200 may store all the coordinates.

(Step S104)

Next, the printing data creation part 200 performs data transmission processing. The printing data creation part 200 executes a device driver and middleware and the like and transmits the printing data 300 selected by the printing data creation part 200 to the card issuing device 1 through a transmission command. Specifically, in a case that the printing data 300 are the printing data 300-2 or the like which are enlarged data, the printing data creation part 200 may indicate this matter by a flag or the like of the transmission command. After that, the printing data creation part 200 transmits the printing data 300 to the card issuing device 1 as data accompanied by the command through a USB or the like.

(Step S201)

Next, the control part 10 of the printing part 13 performs data reception processing. In this step, the control means of the common circuit board 12 receives the printing data 300 from the host apparatus 2. After that, the control means of the common circuit board 12 decodes the printing data 300 and transmits them to the printing part 13. As a result, the control part 10 of the printing part 13 acquires the printing data 300 received from the common circuit board 12 and stores them in the recording medium 11. Alternatively, it may be configured that the control means of the common circuit board 12 directly stores the printing data 300 in the recording medium 11 of the printing part 13 by using DMA (Direct Memory Access) or the like.

(Step S202)

Next, the control part 10 determines whether the printing data are enlarged data or not. The printing part 13 determines "Yes" when the acquired printing data 300 are enlarged data which are enlarged with respect to the original size. The printing part 13 determines "No" when the acquired printing data 300 have the original size. In a case of "Yes", the printing part 13 advances the processing to step S203. In a case of "No", the printing part 13 advances the processing to step S204.

(Step S203)

In a case of the printing data 300 which are enlarged data, the control part 10 performs enlarged data printing processing. The control part 10 controls a driving speed of the drive part 14 to a lower speed than a normal driving speed according to an enlargement ratio of the printing data 300 which are enlarged data and prints on a card 4 by the printing part 13. As a result, even when the printing data 300 are enlarged data, the printing data 300 are printed with the same size as the original size in a state that the resolution in the conveyance direction is increased. This processing will be described in detail below. After that, the control part 10 advances the processing to step S205.

Figure 3C:
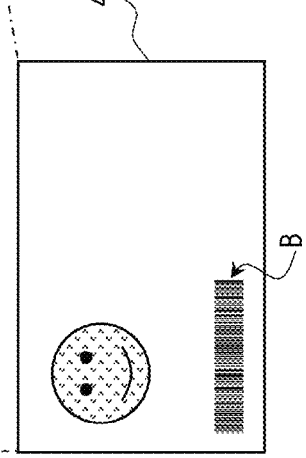

FIG. 3C shows an example of a card 4 where the code is printed as described above. In this example, one-dimensional bar-code "B" is drawn on a card 4 having an original size with the resolution of three times of 300 dpi.

(Step S204)

In a case of the printing data 300 having an original size, the control part 10 performs normal printing processing. In this processing, the control part 10 performs normal printing of the printing data 300. In other words, in this example, the control part 10 drives the drive part 14 so that the printing part 13 prints at normal dpi such as 300 dpi, and printing is performed on a card 4 based on the printing data 300 which does not include the code data.

(Step S205)

In this step, the printing part 13 and the drive part 14 perform medium ejection processing. After the printing has ended, the printing part 13 notifies a printing result to the host apparatus 2 through the common circuit board 12. After that, the printing part 13 drives the drive part 14 to convey the card 4 to a front direction in the conveyance passage and the card 4 is ejected. As a result, a user who operates the ATM or the like is capable of receiving a printed card 4. In this manner, the card issuing processing in accordance with an embodiment of the present invention has finished.

Figure 2:
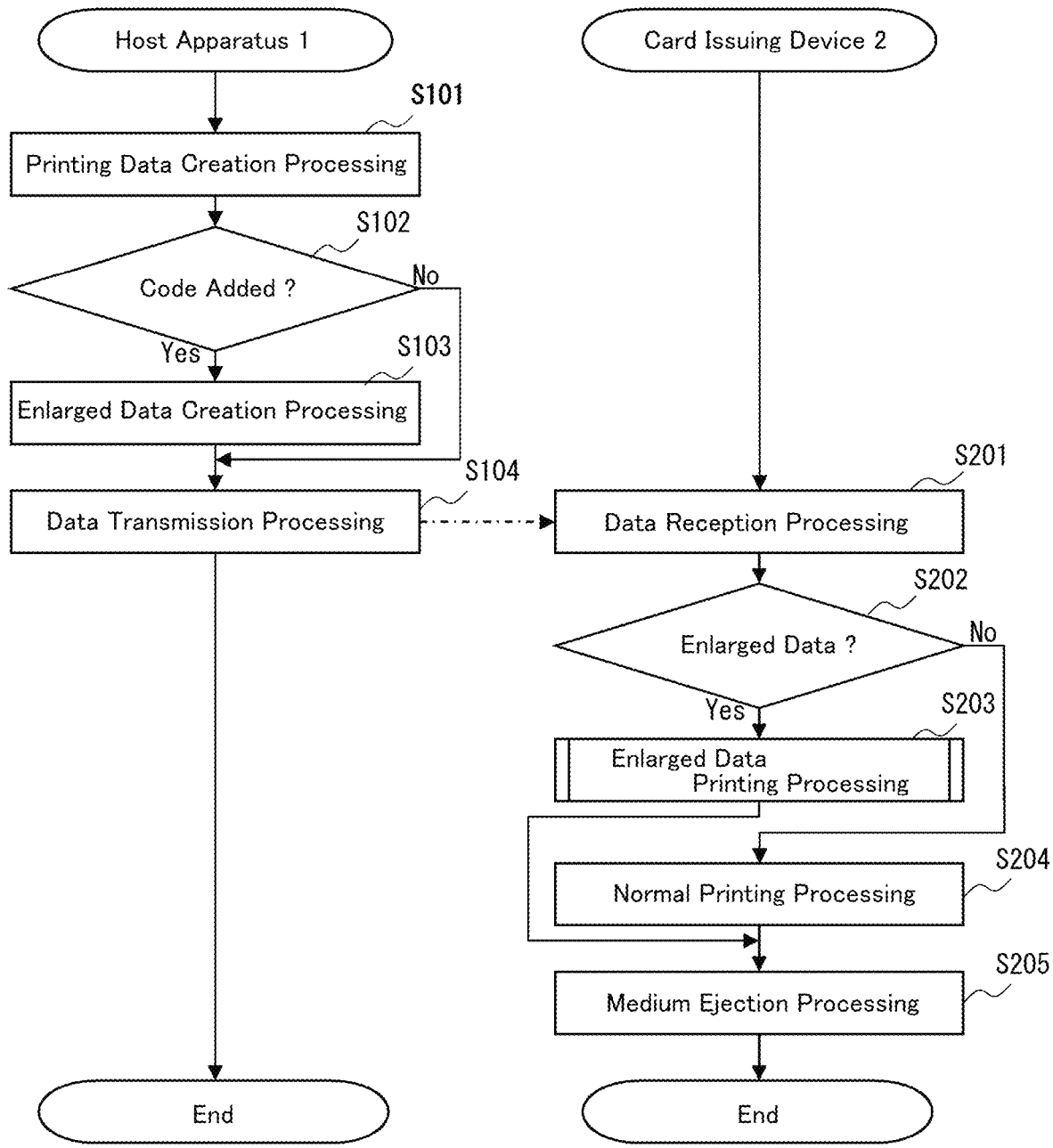
FIG. 2 is a flow chart showing card issuing processing in accordance with an embodiment of the present invention.
Figure 4:
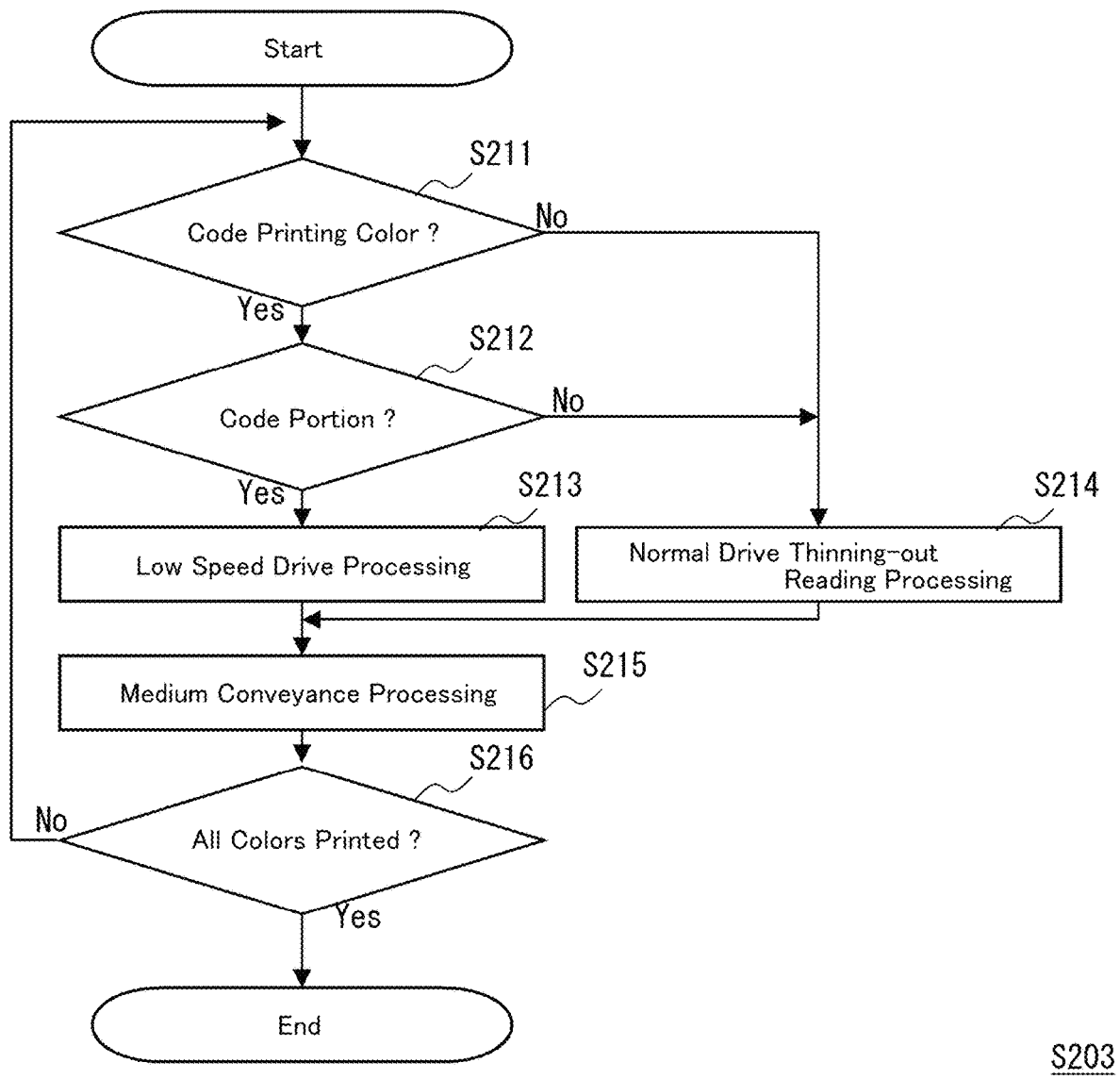
FIG. 4 is a flow chart showing a detail of enlarged data printing processing shown in FIG. 2.

Next, the enlarged data printing processing of the step S203 in FIG. 2 will be described in detail below with reference to a flow chart shown in FIG. 4.

(Step S211)

First, the control part 10 determines whether it is the code printing color or not. In this embodiment, the control part 10 reads out the printing data 300 for each color and performs printing for each corresponding color of consumables 3. Specifically, for example, the control part 10 moves an ink ribbon to a portion of a corresponding color.

After that, the control part 10 determines whether a corresponding color to be printed next is the code printing color or not. In a case that the corresponding color is the code printing color, the control part 10 determines "Yes". In this step, the control part 10 may also determine "Yes" in a case that the code printing color is a printing color for special printing. The control part 10 determines "No" in a case that the corresponding color is not the code printing color. In a case of "Yes", the control part 10 advances the processing to step S212. In a case of "No", the control part 10 advances the processing to step S214.

(Step S212)

In a case of the code printing color, the control part 10 determines a portion of the code data. The control part 10 determines "Yes" at a position just before a particular pixel of a portion of the code data at a time of conveyance when the printing data 300 is printed. The control part 10 determines "No" in a portion where the printing data 300 have no code data. In this case, the control part 10 may determine "No" in a case that printing of the code data has finished or, in a portion where the code data are not to be printed yet. In the case of "Yes", the control part 10 advances the processing to step S213. In the case of "No", the control part 10 advances the processing to the step S214.

(Step S213)

In this step, the control part 10 performs low speed drive processing in a portion of the code data. The control part 10 performs control so that a driving speed of the drive part 14 is set to be a lower speed than a normal driving speed in a portion of the code data in the printing data 300 according to an enlargement ratio of the enlarged data in the printing data 300. Specifically, the control part 10 controls a driving speed so that a conveying speed of a card 4 is set to (1/"n") of a normal driving speed.

For example, in the example shown in FIG. 3, in a case that an enlargement ratio is three-times, a conveyance speed of a card 4 is slowed from 4 milliseconds/line to 12 milliseconds/line for each line of the printing data 300.

After that, the control part 10 reads out all the bitmap data of the printing data 300 in the conveyance direction, and the control part 10 applies an output which becomes density according to a lightness value of a pixel of the bitmap data to a thermal head or the like of the printing part 13 and a card 4 is printed. As a result, the printing data 300 are printed with the resolution of "n"-times with respect to the original size in a conveyance direction.

In the example shown in FIG. 3, in a case that the printing data 300 includes the code data of one-dimensional black bar-code "B" with the resolution of three-times of 300 dpi, the resolution of this portion becomes three times with respect to the original size in a width of a bar in the lateral direction. As a result, even in a case of a bar-code smaller than a normal size, the bar-code can be recognized while reducing an error by a camera of a smart phone and the like.

(Step S214)

In a case of colors except the code printing color, the control part 10 performs normal drive thinning-out reading processing. The control part 10 sets the driving speed to the normal driving speed. In the example shown in FIG. 3, in a case that the enlargement ratio is three times, a conveyance speed of a card 4 is set to be 4 milliseconds/line.

However, in this case, the printing data 300 are enlarged in the conveyance direction and thus, the control part 10 changes reading of the printing data 300 so as to be printed in a size similar to the original size. Specifically, for example, the control part 10 reads out the printing data 300 for each "n"-pixels while thinning-out (skipping) in a conveyance direction and prints them on a card 4 by a thermal head or the like of the printing part 13. Alternatively, for example, the control part 10 may be configured that, instead of thinning-out, a lightness value is calculated, for example, by averaging data for "n"-pixels in a conveyance direction of the printing data 300, acquiring the maximum value, or executing edge processing. After that, the control part 10 applies an output which becomes density according to the lightness value to a thermal head or the like of the printing part 13 to print on a card 4.

As described above, in the example shown in FIG. 3, a portion of colors except the code is drawn with the resolution similar to that of the original size.

(Step S215)

In this step, the control part 10 performs medium conveyance processing. In a case that printing of a color to a card 4 has finished, the control part 10 drives the drive part 14 and conveys the card 4 again to a position where the card 4 is capable of being printed with another color. In this embodiment, the control part 10 conveys the card 4 having been conveyed to a rear side to a front side. In this case, the control part 10 may convey the card to a starting position of printing on a card by the card sensors.

(Step S216)

In this step, the control part 10 determines whether all colors have been printed on the card 4 or not. When all colors of the printing data 300 have been printed and printing of the card 4 has finished, the control part 10 determines "Yes". In this case, the control part 10 may determine "Yes" at a time when printing of an overcoat layer has finished. In other cases, in other words, when other colors are required to be printed, the control part 10 determines "No". In a case of "Yes", the control part 10 finishes the enlarged data printing processing. In a case of "No", the control part 10 returns the processing to the step S211 and continues printing of other colors. In this manner, the enlarged data printing processing in this embodiment has finished.

Principal Effects in this Embodiment

This embodiment is configured as described above and thus; the following effects can be obtained. Conventionally, in a device described in Patent Literature 1, when a code is printed by a dot impact type printer, in a case that a resolution is low, printing is performed by setting a dimension slightly smaller to suppress reduction of the resolution due to a blur or the like. However, in the conventional device, printing of a code in a small size is difficult. Specifically, in a case of a printing part which is capable of printing with conventional 300 dpi, when a size of "1:1" is used as printing data, a length of one pixel is about 0.084 mm and thus, resolution is limited when a bar-code is printed.

On the other hand, the card issuing system "X" in accordance with an embodiment of the present invention is a medium issuing system which includes the card issuing device 1 (medium issuing device), which is a medium issuing device for issuing a card 4 (medium), and the host apparatus 2 for creating printing data 300 for the card issuing device 1. The host apparatus 2 includes the printing data creation part 200 which creates, when the printing data 300 including the code data are to be created, enlarged printing data 300 enlarged in a conveyance direction of the card 4 with respect to an original size that does not include the code data. The card issuing device 1 includes the drive part 14 which drives a conveyance mechanism for conveying a card 4 in an inside of a conveyance passage, the printing part 13 which reads out the printing data 300 according to drive of the drive part 14 to print them on the card 4, and the control part 10 which acquires the enlarged printing data 300 from the host apparatus 2 and controls a driving speed of the drive part 14 at a lower speed than a normal driving speed in at least a portion of the code data according to an enlargement ratio.

According to the above-mentioned structure, the card issuing device 1 can be provided which is capable of printing with a high degree of precision even in a small code. As a result, a camera of a smart phone or the like is capable of recognizing the code with a high degree of precision. As described in the above-mentioned specific example, when the resolution is, for example, three times in a conveyance direction of a card 4, a width of one pixel is 0.084/3=0.028 mm and thus, even in a case of one-dimensional bar-code, printing is performed with a high degree of precision in an extent that a camera of a smart phone or the like is capable of reading. In other words, as described in the above-mentioned example, even in the printing part 13 of about 300 dots per inch (dpi), further fine code can be printed. Further, structural change for enhancing printing performance of the printing part 13 is not required and thus, printing can be performed with a high degree of precision at a low cost.

In the card issuing device 1 in accordance with an embodiment of the present invention, the enlarged printing data 300 including the code data are bitmap data having a size of "n"-times of the original size in the conveyance direction, and the control part 10 controls the driving speed so that a conveyed speed of the card 4 is (1/"n") of the normal driving speed.

According to this structure, in a case that the bitmap data having a size of "n"-times are printed as the printing data 300 as they are, printing can be prevented from being enlarged in a conveyance direction of a card 4. In other words, when a conveyance speed of a card 4 is set to be (1/"n")-times, printing can be performed in the original size.

Further, when the printing data 300 are enlarged with an enlargement ratio of an integral multiple ("n"-times), in a case that a code is to be printed, an error of rounding off and rounding down occurred when a bar width of the code cannot be divided is suppressed to a minimum and printing can be performed with a high degree of precision. In addition, a card 4 can be driven at a time of printing at a fixed low speed so as to be conveyed at a speed of (1/"n")-times according to the enlargement ratio. In other words, a driving speed is easily controlled and thus, jitters, a wow and flutter and the like due to slight variation of a driving speed are suppressed and printing can be performed with a high degree of precision.

Further, conventionally, when a bar-code image having a small size is, for example, pasted to bitmap of 300 dpi, the resolution is reduced to occur a "crushed" state. Even if this is merely enlarged three times in a lateral direction, the crushed state is only extended and the resolution of the code is not enhanced. In other words, even if printing to a card is performed in this state, printing with a high degree of precision is not attained.

On the other hand, the printing data creation part 200 of the host apparatus 2 in accordance with an embodiment of the present invention sets the resolution of the printing data 300 to "n"-times in a conveyance direction of a card 4 when a code is added to the printing data 300.

According to this configuration, the resolution of a code can be prevented from becoming low when the printing data 300 are created and, as a result, printing can be performed with a high degree of precision. In other words, when the code is to be added (drawn) to the printing data 300 in the host apparatus 2, the code is added after enlarged printing data 300 have been prepared and they are printed and thus, highly precise printing of the code can be attained.

In the card issuing device 1 in accordance with an embodiment of the present invention, the printing part 13 performs printing according to color data included in the enlarged printing data 300 for each time when the card 4 is conveyed in a plurality of times, the control part 10 sets a driving speed to a low speed only in a case of printing a color of the code data and, in a case of a color except the printing color, the control part 10 changes reading of the printing data 300 while setting the driving speed to the normal driving speed so as to be printed in a similar size to the original size.

According to this configuration, printing of a color except the code can be performed on a card 4 at a printing speed similar to a speed for the original size. Therefore, reduction of a printing speed for printing the code with a high degree of precision can be suppressed.

Other Embodiments

In the embodiment described above, one-dimensional bar-code as the code is printed with a higher resolution with a conveyance direction of a card 4 as a width direction (lateral direction) of each bar. However, even in a case that two-dimensional bar-code or the like is used as the code, a high resolution can be attained in a conveyance direction and thus, a recognition rate by a smart phone and the like can be enhanced. In addition, also in other dot aggregates, when the resolution is increased in a conveyance direction, the recognition rate can be enhanced. Further, also in a direction perpendicular to a conveyance direction, in other words, in a longitudinal direction in the above-mentioned example, when enlargement is performed at a magnification of "n"-times or different from "n"-times and then dithering or the like is performed, printing precision may be increased in a pseudo manner.

Further, instead of directly drawing the code data added to the printing data 300 to bitmap data, the code data may be separately attached as vector data or image data of bitmap data. In addition, the printing data 300 may be PDF (Portable Document Format), PS (Post Script), or data including vector data such as object-unit data. According to this configuration, various configurations can be utilized.

In the embodiment described above, the code data is added to the printing data 300 in the host apparatus 2 and, in addition, the data is designated as data with a higher resolution. However, in the control part 10 of the card issuing device 1, the printing data 300 are convoluted and analyzed and discriminated by image processing such as NN (neural network) and, in a case that addition of the code is determined, the above-mentioned processing may be performed. In addition, it may be configured that the printing data 300 are not bitmap data, or image data of the code are separately transmitted. In this case, the control part 10 may request image data of the code of an original size to the host apparatus 2 by transmitting a command and receives transmitted data from the host apparatus 2. In this case, when the code is to be directly added (drawn) to printing data 300 stored in the recording medium 11, it may be configured that the code is added after the printing data 300 have been enlarged. According to this configuration, even when a special application is not installed in the host apparatus 2, a high-resolution code can be printed.

Further, in the embodiment described above, a driving speed is set to a low speed only in a portion where the code data exist in the printing data 300 for a printing color of the code data. However, a portion where the code data exist may be driven at a low speed for all printing colors. Alternatively, a driving speed may be set to a low speed for a printing color of the code data regardless of a portion where the code data exist. Alternatively, when the code data exist, a driving speed may be set to a low speed for all printing colors. In these cases, as described above, a portion of the code data is determined from the printing data 300 to determine whether a driving speed is set to a low speed or not. According to this configuration, while a speed reduction in printing of the code is suppressed, occurrence of a minute shift due to speed variation of a printing portion of the code data and changes in printing due to change of the resolution are suppressed and a card 4 can be printed with a high degree of precision.

In addition, in the embodiment described above, when driven at a low speed, control of a lightness value and density of the printing data 300 is not changed. However, in a case that the density is increased when driven at a low speed, the density may be controlled to be decreased. In this case, instead of simply setting the density to (1/"n")-times, density control may be performed according to a stepwise or a specific density change curve depending on lightness values of pixels of the printing data 300. As a result, printing precision for a card 4 can be further enhanced.

In the embodiment described above, a card 4 is printed by a thermal transfer type or a sublimation type printer which mainly uses an ink ribbon. However, other printing system printers such as a thermal printer which uses a thermosensitive paper, ink jet printer, dot matrix printer, electronic dry photographic system printer, laser marking type printer and fusion type or ultraviolet curing type 3D printer can be used as a printer which conveys a card 4. In addition, a printer for cut-form printing, a printer for a roll sheet, and a monochrome type printer may be utilized. Further, the above-mentioned density control method may be also changed depending on these printing systems. According to this structure, printing of a card 4 corresponding to various structures can be attained.

In the embodiment described above, the host apparatus 2 is a main body such as an ATM. However, the host apparatus 2 may be a PC, a smart phone or the like for designing a card 4. In this case, it may be configured that an application for designing a card 4 is installed in a PC, a smart phone or the like, which is connected with the printing part 13 by wire or wirelessly.

In the embodiment described above, the printing data 300 are transmitted from the host apparatus 2 to the card issuing device 1 which is directly connected with the host apparatus 2. However, it may be configured that the printing data 300 are encrypted by a common key, a public key or the like and then, the printing data 300 are transmitted to the card issuing device 1 through a network. This configuration is capable of coping with various structures. Further, when encrypted, security is enhanced.

Further, it may be configured that the printing part 13 of the card issuing device 1 is not mounted on the card issuing device 1 and is separately connected with the card issuing device 1 through a USB or wirelessly or the like. Alternatively, it may be structured that the card issuing device 1 is not connected with the host apparatus 2 within a housing, but the card issuing device 1 is connected with the host apparatus 2 such as a PC or a smart phone through a USB or wirelessly. In addition, the card issuing device 1 may be capable of printing in a so-called "standalone" state in which the card issuing device 1 is not connected with the host apparatus 2. In this case, it may be configured that the card issuing device 1 in a standalone state is temporarily connected with the host apparatus 2 or a maintenance terminal to acquire the above-mentioned printing data 300.

In the embodiment described above, a code is printed on a card 4 which is an example of a medium. However, instead of a card 4, for example, other media on which printing of a code is required, i.e., a parking ticket, an admission ticket, a ticket for train, airplane or the like, other tickets, a label printed by a label printer, a receipt, a printing device of conductive ink such as an RFID can be issued with a similar configuration. This configuration is capable of coping with various media.

Further, in the embodiment described above, a configuration for issuing a card 4 in the card issuing device 1 is mainly described. However, the card issuing device 1 may include a function of a card reader which includes a head for reading information stored in a card 4 and the like. The head and the like includes, for example, a magnetic head, an encryption magnetic head, IC contacts, an electromagnetic induction antenna and the like. In a case of a magnetic head, when a card 4 is contacted with and slid on the magnetic head, magnetic information recorded in a magnetic stripe provided on the card 4 can be read out and written to the magnetic stripe. In IC contacts, an electromagnetic induction antenna and the like, when the IC contacts are contacted with contact points of a card 4 or by electromagnetic induction or the like, information stored in an IC incorporated in a card 4 can be read out and written to the IC.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A medium issuing device for issuing a medium, the medium issuing device comprising:
   a drive part which drives a conveyance mechanism for conveying the medium in a conveyance passage;
   a printing part which reads out printing data and prints on the medium according to drive by the drive part; and
   a control part which acquires enlarged printing data when code data are included in the printing data, the enlarged printing data being enlarged in a conveyance direction of the medium with respect to an original size which do not include the code data,
   wherein the control part controls a driving speed of the drive part to a lower speed than a normal driving speed according to an enlargement ratio at least in a portion of the code data.

2. The medium issuing device according to claim 1, wherein
   the enlarged printing data including the code data are bitmap data having a size of "n"-times of the original size in the conveyance direction, and
   the control part controls the driving speed so that a speed that the medium is conveyed is set to be (1/"n") of the normal driving speed.

3. The medium issuing device according to claim 2, wherein
   the printing part performs printing according to color data included in the enlarged printing data for each time when the medium is conveyed at a plurality of times, the control part sets the driving speed to the lower speed only in a case of a printing color of the code data, and
   in a case of a color except the printing color, the control part changes reading of the printing data so as to be printed in a size similar to the original size while setting the driving speed to the normal driving speed.

4. The medium issuing device according to claim 1, wherein
   the printing part performs printing according to color data included in the enlarged printing data for each time when the medium is conveyed at a plurality of times, the control part sets the driving speed to the lower speed only in a case of a printing color of the code data, and
   in a case of a color except the printing color, the control part changes reading of the printing data so as to be printed in a size similar to the original size while setting the driving speed to the normal driving speed.

5. A medium issuing system comprising:
   a medium issuing device which issues a medium; and
   a host apparatus which creates printing data for the medium issuing device,
   wherein the host apparatus comprises a printing data creation part which creates enlarged printing data which are enlarged in a conveyance direction of the medium when the printing data including code data are to be created, the enlarged printing data being enlarged with respect to an original size which do not include the code data; and
   wherein the medium issuing device comprises:
   a drive part which drives a conveyance mechanism for conveying the medium in a conveyance passage;
   a printing part which reads out the printing data and prints on the medium according to drive by the drive part; and
   a control part which acquires the enlarged printing data from the host apparatus and controls a driving speed of the drive part to a lower speed than a normal driving speed according to an enlargement ratio at least in a portion of the code data.

6. A medium issuing method which is executed by a medium issuing device for issuing a medium, the medium issuing method comprising:
   driving a conveyance mechanism which conveys the medium in a conveyance passage;
   in a case that code data are included in printing data, acquiring enlarged printing data which are enlarged in a conveyance direction of the medium with respect to an original size which do not include the code data;
   controlling a driving speed to a lower speed than a normal driving speed according to an enlargement ratio at least in a portion of the code data; and
   reading out the printing data and printing on the medium according to drive for conveying the medium.

* * * * *